US009288887B2

(12) United States Patent
Norris et al.

(10) Patent No.: US 9,288,887 B2
(45) Date of Patent: Mar. 15, 2016

(54) PLASMA ARC TORCH WITH SECONDARY STARTING CIRCUIT AND ELECTRODE

(75) Inventors: Steve Norris, New London, NH (US); Roger Hewitt, Plainfield, NH (US); Ken Isenor, Sharon, VT (US); Christopher J. Conway, Wilmot, NH (US)

(73) Assignee: Victor Equipment Company, Denton, TX (US)

( * ) Notice: Subject to any disclaimer, the term of this patent is extended or adjusted under 35 U.S.C. 154(b) by 846 days.

(21) Appl. No.: 13/480,403

(22) Filed: May 24, 2012

(65) Prior Publication Data

US 2012/0298635 A1 Nov. 29, 2012

Related U.S. Application Data

(60) Provisional application No. 61/489,297, filed on May 24, 2011.

(51) Int. Cl.

*B23K 10/00* (2006.01)
*B23K 10/02* (2006.01)
*H05H 1/26* (2006.01)
*H05H 1/32* (2006.01)
*H05H 1/36* (2006.01)
*H05H 1/34* (2006.01)

(52) U.S. Cl.

CPC . *H05H 1/34* (2013.01); *H05H 1/36* (2013.01); *H05H 2001/3426* (2013.01); *H05H 2001/3452* (2013.01)

(58) Field of Classification Search

CPC ........ B23K 35/38; B23K 26/00; B23K 26/04; B23K 9/00; B23K 9/02; H05H 1/26; H05H 1/32; H05H 1/36; H05H 1/48

USPC ........................................ 219/121.36–121.59

See application file for complete search history.

(56) References Cited

U.S. PATENT DOCUMENTS 3,238,349 A * 3/1966 Anderson et al. ............... 219/75
3,832,513 A * 8/1974 Klasson .......................... 219/75
3,949,188 A * 4/1976 Tateno ..................... 219/121.36
4,174,477 A * 11/1979 Essers et al. ............. 219/121.46
4,549,065 A * 10/1985 Camacho et al. ........ 219/121.48
4,596,918 A * 6/1986 Ponghis ................... 219/121.48
4,598,191 A * 7/1986 Marhic et al. ............ 219/121.57
5,994,663 A * 11/1999 Lu ............................ 219/121.51

(Continued)

OTHER PUBLICATIONS

International Search Report dated Oct. 12, 2012 issued in PCT/US2012/039470.

*Primary Examiner* — David Angwin
*Assistant Examiner* — Michael Laflame, Jr.
(74) *Attorney, Agent, or Firm* — Kacvinsky Daisak Bluni PLLC

(57) ABSTRACT

A plasma arc torch includes an electrode, a tip, a third element, and a secondary power circuit. The electrode is disposed within the plasma arc torch and adapted for electrical connection to a cathodic side of a power supply. The tip is positioned distally from the electrode and adapted for electrical connection to an anodic side of the power supply during piloting. A plasma chamber is formed between the electrode and the tip. The third element is disposed near a proximal end of the plasma chamber. The secondary power circuit is disposed proximate the plasma arc torch and in electrical communication with the third element. The secondary power circuit is configured to generate a high voltage pulse on the third element using input to secondary power circuit to initiate a first arc to start the plasma arc torch.

21 Claims, 16 Drawing Sheets

(56) References Cited

U.S. PATENT DOCUMENTS

| | | | | |
|---|---|---|---|---|
| 6,717,096 | B2 * | 4/2004 | Hewett et al. | 219/121.48 |
| 7,022,935 | B1 * | 4/2006 | Matus et al. | 219/121.39 |
| 7,091,441 | B1 * | 8/2006 | Kuo | 219/121.36 |
| 2005/0236376 | A1 * | 10/2005 | Eccles | 219/121.36 |
| 2008/0083713 | A1 * | 4/2008 | Sanders | 219/121.57 |
| 2009/0134129 | A1 * | 5/2009 | Robarge et al. | 219/121.48 |

* cited by examiner

PLASMA ARC TORCH WITH SECONDARY STARTING CIRCUIT AND ELECTRODE

CROSS-REFERENCE TO RELATED APPLICATIONS

This application claims priority to U.S. Provisional Application No. 61/489,297, filed on May 24, 2011, entitled "Plasma Arc Torch With Secondary Starting Circuit and Electrode." The disclosure of the above application is incorporated herein by reference.

FIELD

The present disclosure relates to plasma arc torches, and in particular, methods and devices for initiating a pilot arc in a plasma arc torch.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

In automated plasma arc torch applications, the plasma arc torch operates at current levels between approximately 30 amps and 1,000 amps or more. A relatively high voltage (HV) start circuit is applied to generate a pilot arc between the electrode and the tip. In a typical hand system, the HV generating circuit is in the power supply and the entire torch lead (with its associated capacitance) must be charged up to obtain a HV signal at the torch tip to start the arc. As a result, the power supply and the entire torch lead radiate energy into the surroundings, thereby generating noise in the power supply and surrounding electronic systems. In an automated system, the HV generating circuit may be provided at or near the torch head to reduce the length of the circulating path for the HV current. However, a large inductor is generally provided in series with the electrode or tip lead to isolate the HV generating circuit from the torch lead and results in a relatively large HV circuit that still radiates energy and noises to the surrounding environment.

SUMMARY

In one form of the present disclosure, a plasma arc torch includes an electrode, a tip, a third element, and a secondary power circuit. The electrode is disposed within the plasma arc torch and adapted for electrical connection to a cathodic side of a power supply. The tip is positioned distally from the electrode and adapted for electrical connection to an anodic side of the power supply during piloting. A plasma chamber is formed between the electrode and the tip. The third element is disposed near a proximal end of the plasma chamber. The secondary power circuit is disposed proximate the plasma arc torch and in electrical communication with the third element. The secondary power circuit is configured to generate a high voltage pulse on the third element using an input to secondary power circuit to initiate a first arc to start the plasma arc torch.

In another form, a system for initiating a first arc in a plasma arc torch includes a third element and a secondary power circuit. The plasma arc torch has an electrode and a tip electrically connected to a power supply and configured to ionize a gas to generate a plasma stream. The secondary power circuit is disposed proximate the plasma arc torch and in electrical communication with the third element. The secondary power circuit is configured to generate a high voltage pulse on the third element using open circuit voltage of the power supply to initiate a first arc to start the plasma arc torch.

In still another form, a method of initiating a first arc in a plasma arc torch includes generating a high voltage pulse on a third element using a secondary power circuit in electrical communication with the third element. The secondary power circuit is separate from a power supply that sends electrical current to an electrode and tip of the plasma arc torch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
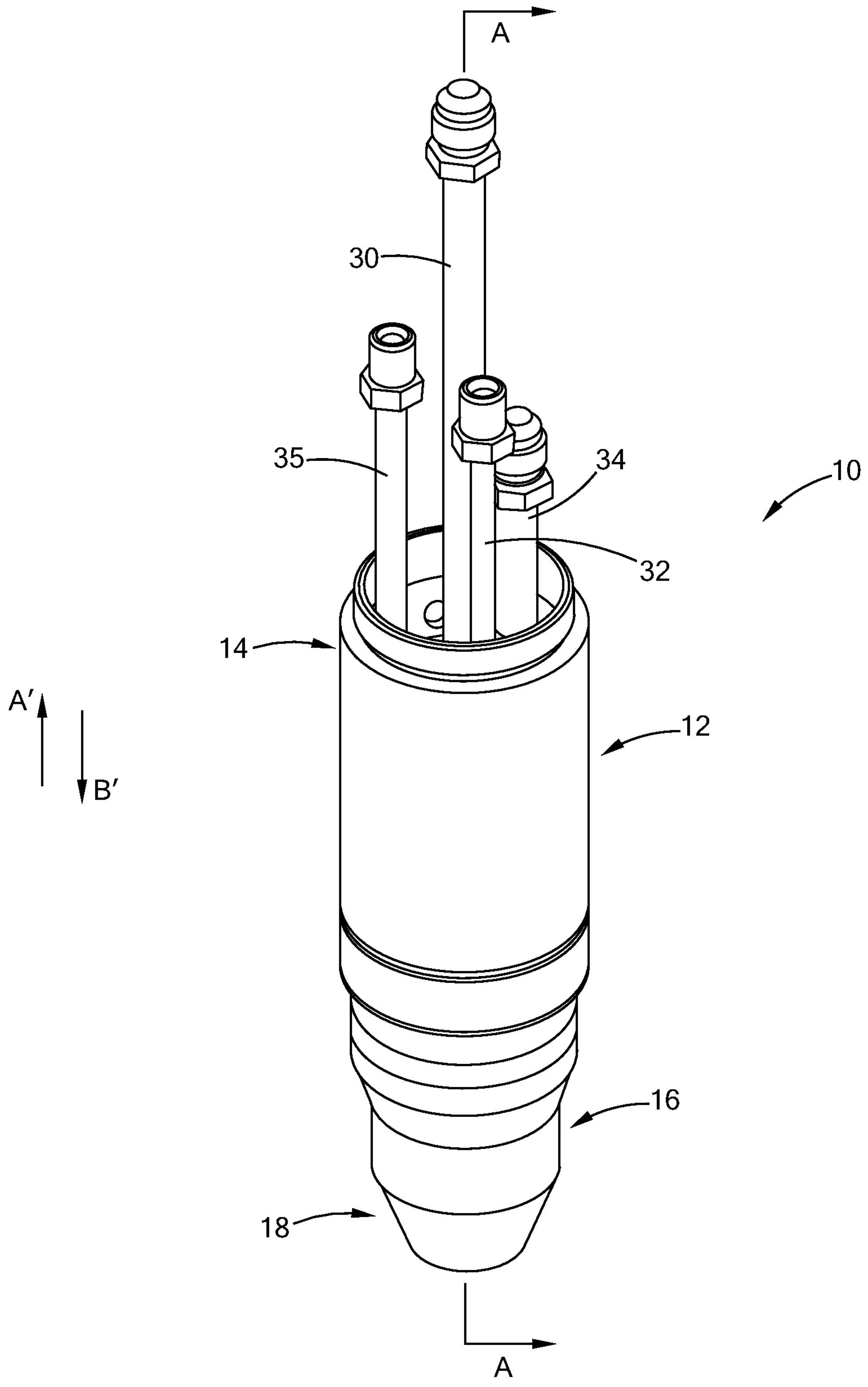
FIG. 1 is a perspective view of a plasma arc torch constructed in accordance with the principles of the present disclosure.
Figure 2:
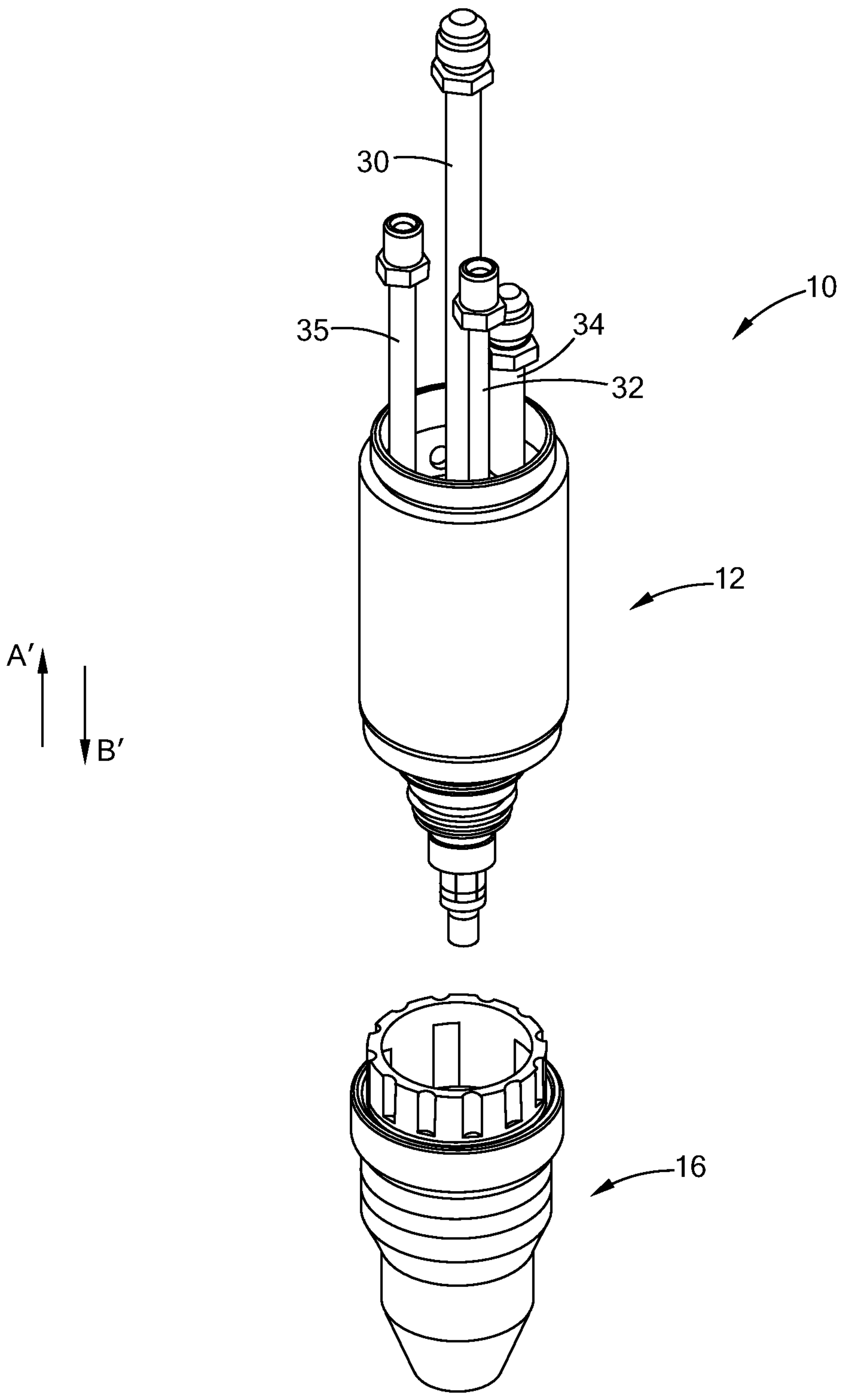
FIG. 2 is an exploded perspective view of a plasma arc torch constructed in accordance with the principles of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to the drawings, a plasma arc torch according to the present invention is illustrated and indicated by reference numeral 10 in FIG. 1 through FIG. 4. The plasma arc torch 10 generally comprises a torch head 12 disposed at a proximal end 14 of the plasma arc torch 10 and a plurality of consumable components 16 secured to the torch head 12 and disposed at a distal end 18 of the plasma arc torch 10 as shown.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present disclosure. Additionally, proximal direction or proximally is the direction towards the torch head 12 from the consumable components 16 as depicted by arrow A', and distal direction or distally is the direction towards the consumable components 16 from the torch head 12 as depicted by arrow B'.

Figure 3:
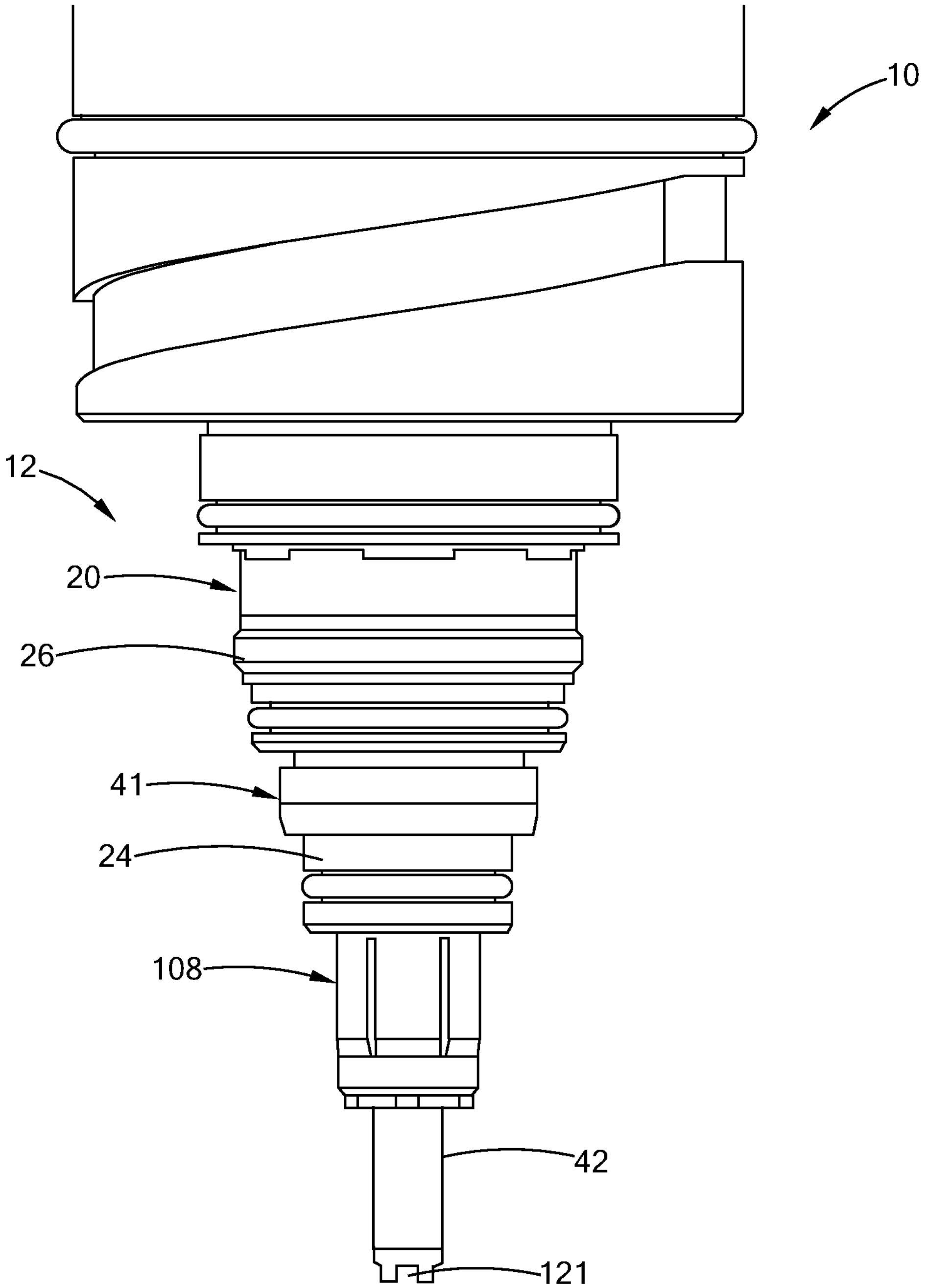
FIG. 3 is a perspective view of a torch head constructed in accordance with the principles of the present disclosure.
Figure 4:
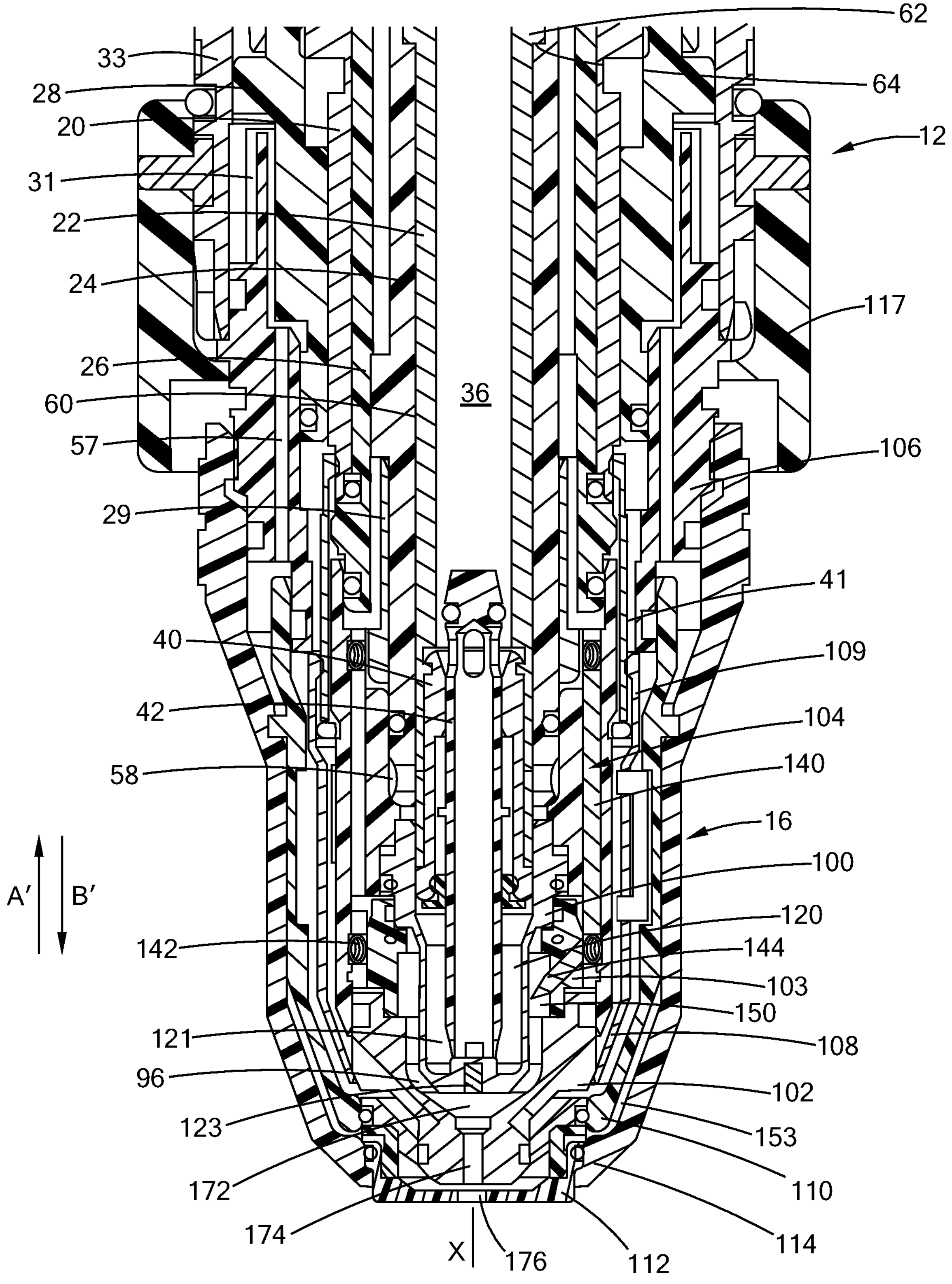
FIG. 4 is an enlarged longitudinal cross-sectional view of a distal portion of the plasma arc torch of FIG. 1 in accordance with the principles of the present invention.

Referring more specifically to FIGS. 3 and 4, the torch head 12 includes an anode body 20 that is in electrical communication with the positive side of a power supply (not shown), and a cathode 22 that is in electrical communication with the negative side of the power supply. The torch head 12 further includes a central insulator 24, an intermediate insulator 26, and an outer insulator 28. Both the central insulator 24 and the intermediate insulator 26 surround the cathode 22 to insulate the cathode 22 from the anode body 20. The outer insulator 28 surrounds the anode body 20 to insulate the anode body 20 from a housing 33, which encapsulates and protects the torch head 12 and its components from the surrounding environment during operation. The torch head 12 is further adjoined with a coolant supply tube 30, a plasma gas tube 32, a coolant return tube 34, and a secondary gas tube 35 (shown in their entirety in FIGS. 1 and 2), wherein plasma gas and secondary gas are supplied to and cooling fluid is supplied to and returned from the plasma arc torch 10 during operation as described in greater detail below. The connection between the torch head 12 and the coolant supply tube 30, the plasma gas tube 32, the coolant return tube 34, and the secondary gas tube 35, as well as the electrical connection between the anode body 20, the cathode 22 and the power supply have been described in U.S. Pat. No. 7,019,254, titled "Plasma Arc Torch" and commonly assigned with the present application, the contents of which are incorporated herein by reference.

The cathode 22 preferably defines a cylindrical tube having a central bore 36 that is in fluid communication with the coolant supply tube 30. The central bore 36 is also in fluid communication with a cathode cap 40 and a coolant tube 42. Generally, the coolant tube 42 serves to distribute the cooling fluid and the cathode cap 40 protects the distal end of the cathode 22 from damage during replacement of the consumable components 16 or other repairs. The structure of the coolant tube 42 and distribution of cooling fluid by the coolant tube 42 have been disclosed in U.S. Pat. No. 6,852,944, title "Retractable Electrode Coolant Tube" and commonly assigned with the present application, the contents of which are incorporated herein by reference.

The central insulator 24 preferably defines a cylindrical tube having an internal bore that houses the cathode 22 as shown. The cathode 22 defines a proximal external shoulder 62 that abuts a proximal internal shoulder 64 of the central insulator 24 to position of the cathode 22 along the central longitudinal axis X of the plasma arc torch 10. An intermediate insulator 26 surrounds the central insulator 24 and defines an annular passageway 29 therebetween, which is in fluid communication with the plasma gas tube 32. An outer insulator 28 surrounds the anode 20 and insulates the anode 20 from a housing 33. An annular passageway 31 is defined between the outer insulator 28 and the housing 33 and in fluid communication with the secondary gas tube 35.

The consumable components 16 comprise an electrode 100, a tip 102, a gas distributor 103, a third element 104, and a cartridge body 106. The cartridge body 106 generally houses and positions the other consumable components 16. The cartridge body 106 also distributes plasma gas, secondary gas, and cooling fluid during operation of the plasma arc torch 10, which is described in greater detail below. The third element 104 is housed in the cartridge body 106 for generating a pilot arc, which will be described in further detail below. Additionally, the consumable components 16 comprise a distal anode member 108 and a central anode member 109 to form a portion of the anodic side of the power supply by providing electrical continuity to the tip 102. The distal anode member 108 is disposed between the cartridge body 106 and a baffle member 110 and is in electrical contact with the tip 102 at a distal portion and with the central anode member 109 at a proximal portion. Further, the central anode member 109 is in electrical contact with a distal portion of the anode body 20. The baffle member 110 is shown disposed between the distal anode member 108 and a shield cap 114. Further, the consumable components 16 comprise a secondary cap 112 defining a central orifice 176 for the distribution of the secondary gas. A locking ring 117 is shown disposed around the proximal end portion of the consumable components 16 and a distal portion of the housing 33 to secure the consumable components 16 to the torch head 12.

The electrode 100 is centrally disposed within the cartridge body 106 and is in electrical contact with the cathode 22. The electrode 100 further defines a distal cavity 120 that is in fluid communication with the coolant tube 42 through distal passageways 121 of the coolant tube 42. The electrode 100 of the illustrated embodiment is constructed of copper or a copper alloy and preferably comprises an emissive insert 123 secured within a recess at the distal end 96 of the electrode 100.

The tip 102 is electrically separated from the electrode 100 and is in a radially and longitudinally spaced relationship with the electrode 100 to form a plasma chamber 172 between the electrode 100 and the tip 102. The tip 102 further comprises a central exit orifice 174, through which a plasma stream exits during operation of the plasma arc torch 10 as the plasma gas is ionized within the plasma chamber 172.

As further shown, the shield cap 114 generally secures and positions the consumable components therein, in addition to insulating an area surrounding the torch head 20 from the conductive components during operation. The baffle member 110 is provided within the shield cap 114 to form a secondary gas passageway 153. The shield cap 114 is preferably made of a non-conductive, heat insulating material, such as a phenolic or ceramic. Generally, the secondary gas flows from a plurality of proximal axial passageways 57 formed in the cartridge body 106 into the secondary gas passage 150 and through the secondary cap 112, as described in greater detail below, to stabilize the plasma stream exiting the secondary cap 112 in operation. The shield cap 114 further positions the secondary cap 112.

Figure 5:
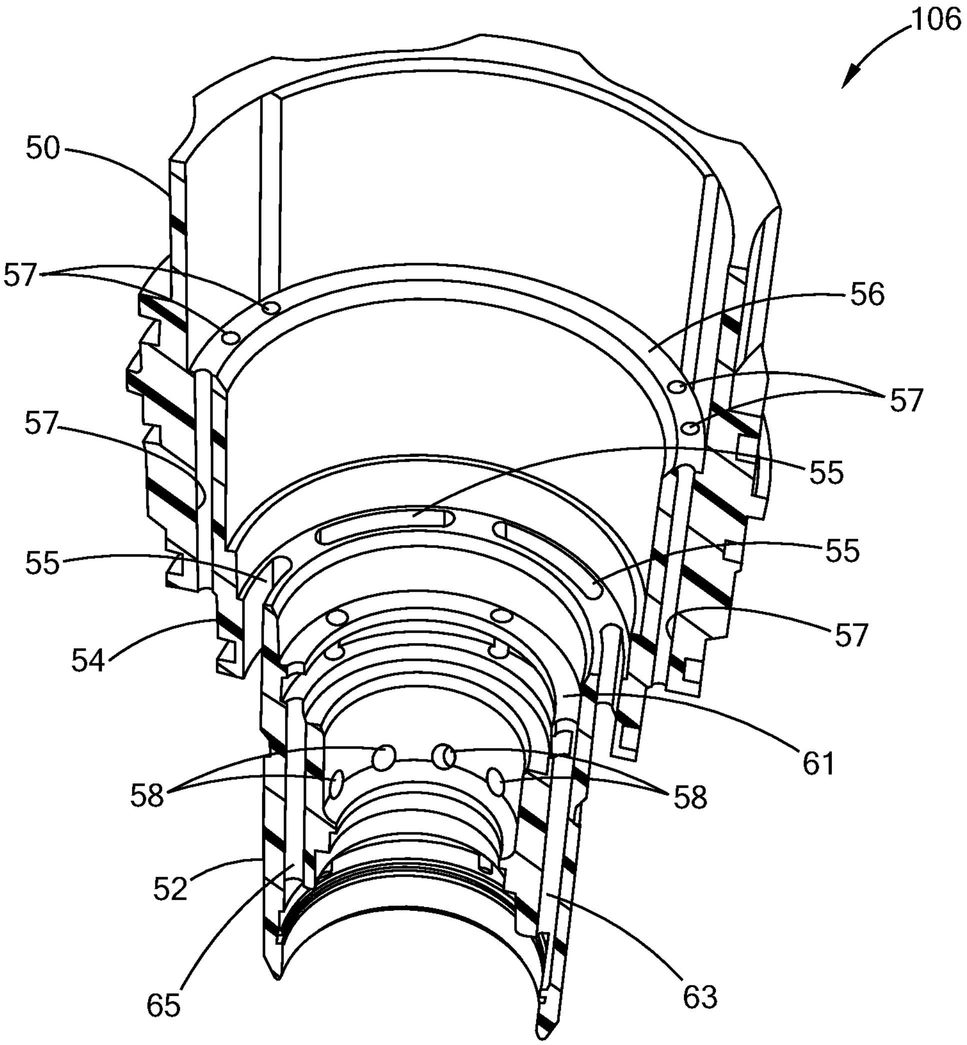
FIG. 5 is a cross-sectional, perspective view of a cartridge body disposed with a torch head constructed in accordance with the principles of the present disclosure.

Referring to FIG. 5, the cartridge body 106 includes a proximal portion 50, a distal portion 52, and a shoulder portion 54 between the proximal portion 50 and the distal portion 52. The proximal portion 50 defines a substantially cylindrical shape and includes an inner annular flange 56. A plurality of axial passageways 57 are formed through the inner annular flange 56 for directing secondary gas from the annular passageway 31 to a secondary gas passageway 153 between the shield cap 114 and the baffle member 110. The shoulder portion 54 defines a plurality of axial cutout portions 55 along the circumference of the shoulder portion 54 for mounting the central anode member 109. The distal portion 50 includes an inner annular flange 61 defining a plurality of axial receiving spaces 63 that receive conductive extensions 140 of the third element 104, which will be described in further detail below. The should portion 54 further defines an axial passageway 65 for directing the plasma gas from the annular passageway 29 between the central insulator 24 and the intermediate insulator 26 to the plasma gas chamber 123 through the gas distributor 103. The distal portion 52 further defines a plurality of radial passageways 58 for directing the coolant gas flowing from the electrode 100 outside the cartridge body 106 to further cool the consumable components 16 disposed outside the cartridge body 106.

In addition to positioning the various consumable components 16 and directing the plasma gas, the secondary gas and the cooling gas, the cartridge body 106 also separates anodic member (e.g., central anode member 109) from the third element 104, which will be described in further detail below. Accordingly, the cartridge body 106 is an insulative material such as PEEK® or other similar material commonly known in the art that is further capable of operating at relatively high temperatures.

Figure 6:
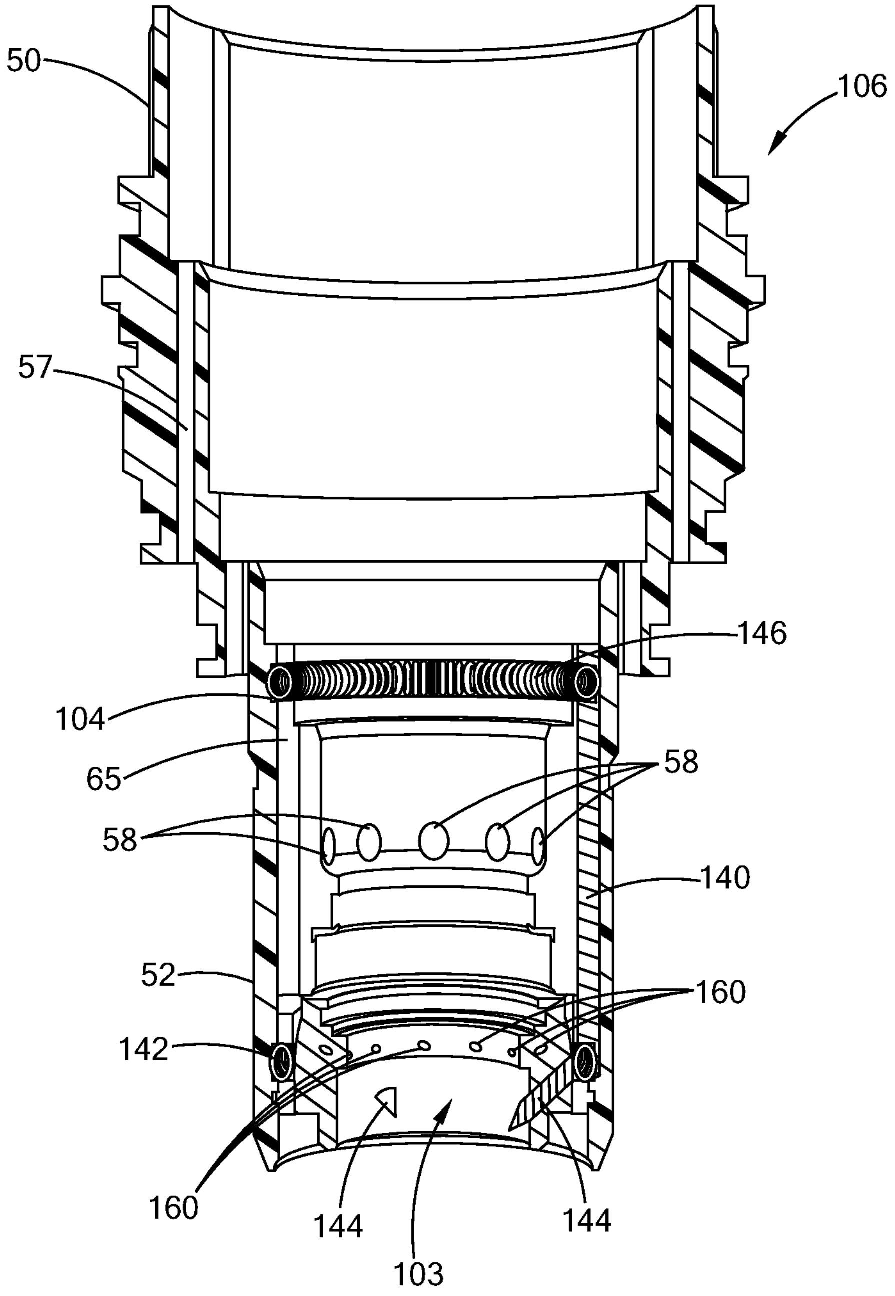
FIG. 6 is a cross-sectional, perspective view of a cartridge, a gas distributor and a third element disposed within a torch head constructed in accordance with the principles of the present disclosure.

Referring to FIG. 6, the gas distributor 103 is disposed within the distal portion 52 of the cartridge body 106 and defines a plurality of radial passageways 160 in fluid communication with the axial passageways 57 of the cartridge body 106.

Figure 7:
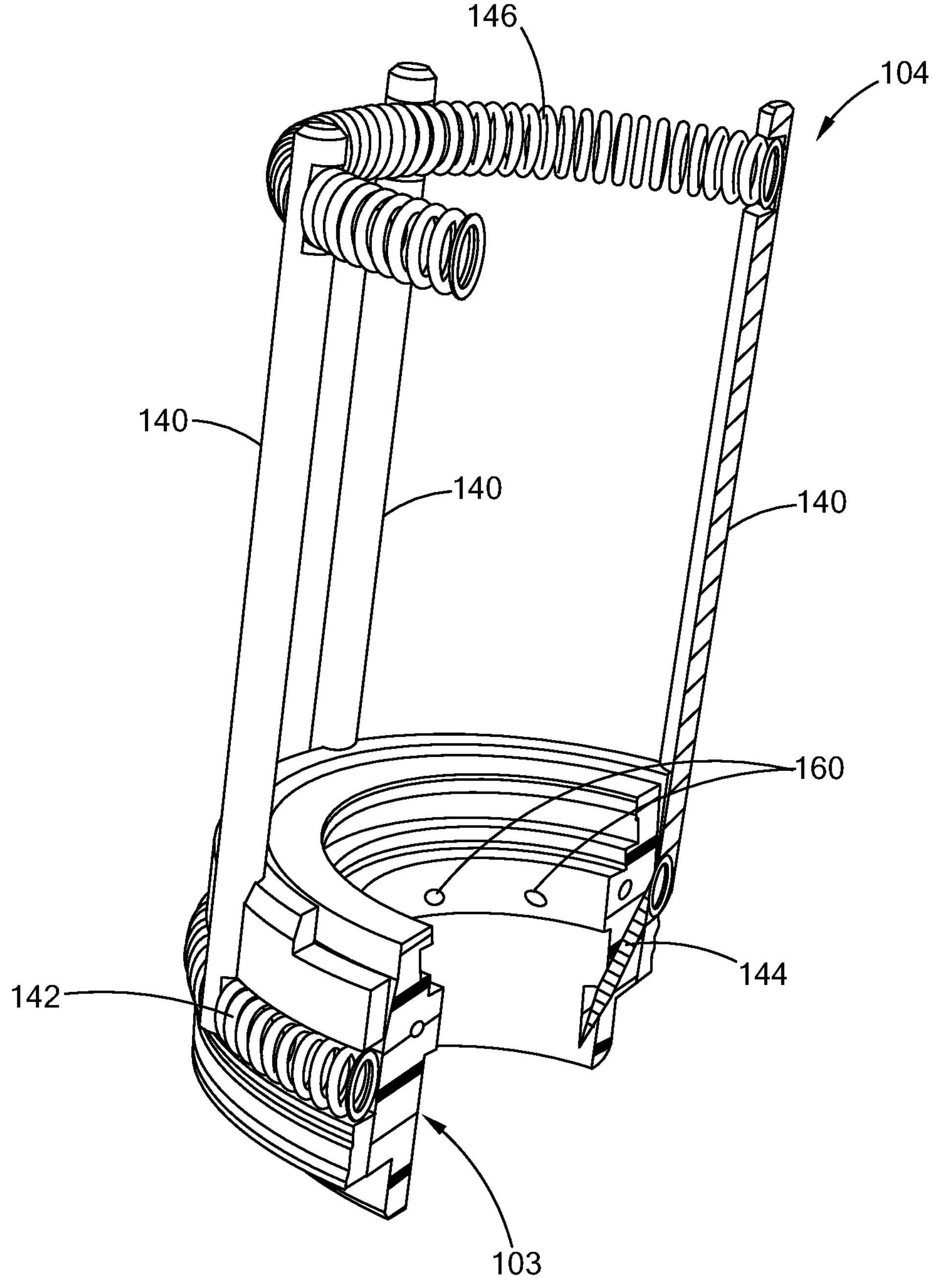
FIG. 7 is a cross-sectional, perspective view of a gas distributor and a third element constructed in accordance with the principles of the present disclosure.

Referring to FIGS. 4, 6 and 7, the third element 104 is disposed near a proximal end of the plasma chamber 123. The third element 104 includes a plurality of conductive extensions 140, a first conductive ring 142 surrounding the gas distributor 103, a plurality of conductive inserts 144 extending through the gas distributor 103 and into a gas receiving chamber 150 (shown in FIG. 4), and a second conductive ring 146. The gas receiving chamber 150 is defined between the gas distributor 103 and the distal portion 52 of the cartridge body 106 and is in fluid communication with the plasma chamber 172. The first and second conductive rings 142 and 146 may be annular springs. The conductive extensions 140 are inserted into the axial receiving spaces 63. The second conductive ring 146 engages a conductive sleeve 41 (shown in FIG. 4), which, in turn, is electrically connected to a secondary start circuit 200 separate from a main power circuit 202 (both shown in FIG. 15), which will be described in detail later. The third element 104 form part of the secondary start circuit 200 and is insulated from the anodic members (including the anode 20, the central anode member 109, the distal anode member 108, and the tip 102) and the cathodic members (including the cathode 22 and the electrode 100).

The conductive sleeve 41 for the third element 104 is received within the annular passageway 39 defined between the central insulator 24 and intermediate insulator 26. The central insulator 24 further insulates the conductive sleeve 41 from the cathode 32 and the intermediate insulator 26 insulates the conducive sleeve 41 from the anode 20. The conductive sleeve 41 is used to establish an electrical connection between the third element 104 and the second starting circuit 200, which will be described in further detail below.

Figure 8:
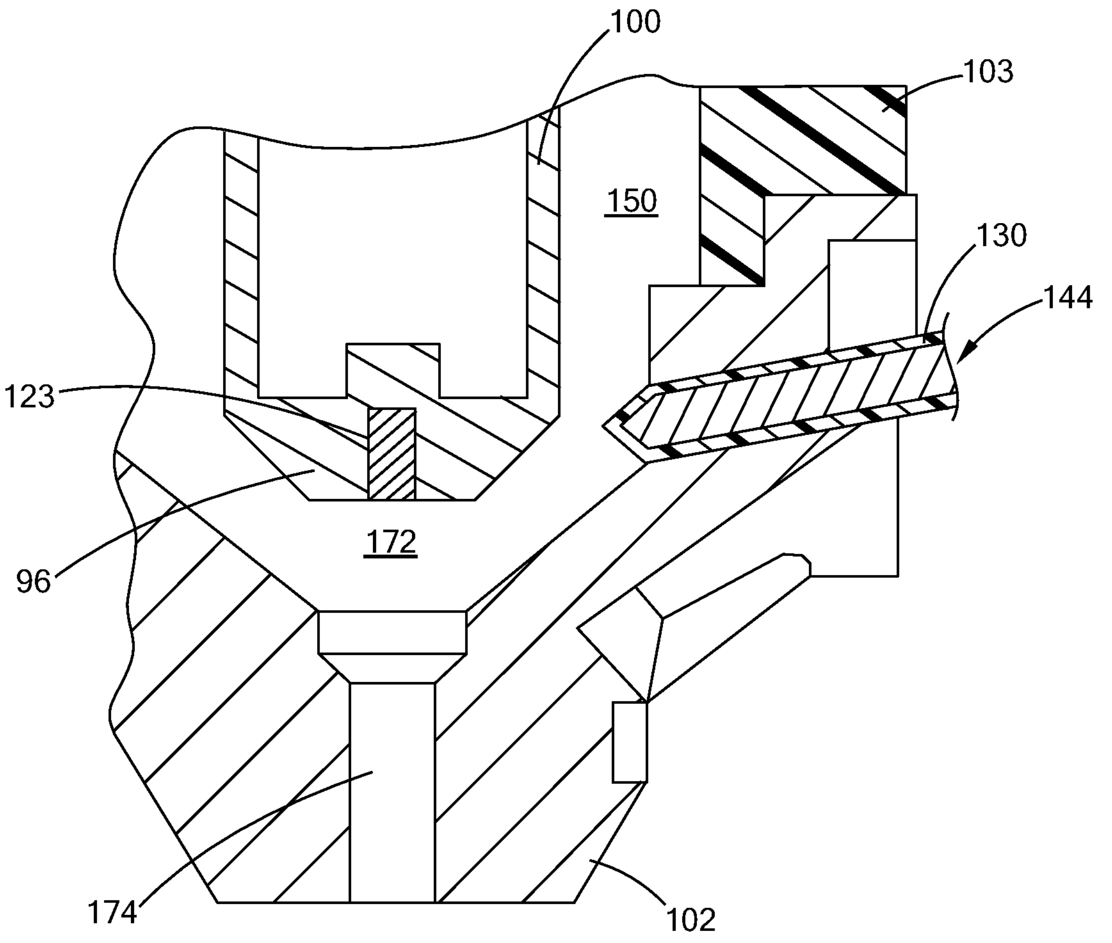
FIG. 8 is a schematic view of an alternate form of a conductive insert of a third element constructed in accordance with the principles of the present disclosure.

Referring to FIG. 8, an alternative form of the conductive inserts 144 is shown to be provided through a tip 102, rather than the gas distributor 103 as previously set forth. In this embodiment, the conductive insert 144 of the third element 104 is electrically insulated and extends through the tip 102 into the plasma gas chamber 172 as shown. The conductive insert 144 includes at least one insulating layer 130 to insulate the conductive insert 144 from the anodic tip 102. It is understood that the conductive inserts 144 may be provided through or within any component other than the gas distributor 103 and/or the tip 102 as illustrated and described herein to form the pilot arc without departing from the scope of the present disclosure.

Referring back to FIG. 4, in operation, the cooling fluid flows distally through the central bore 36 of the cathode 22, through the coolant tube 42, and into the distal cavity 120 of the electrode 100. The cooling fluid then flows proximally through the proximal cavity 118 of the electrode 100 to provide cooling to the electrode 100 and the cathode 22 that are operated at relatively high currents and temperatures. The cooling fluid continues to flow proximally to the radial passageways 58 in the cartridge body 106. The cooling fluid flows outside the cartridge body 106 to continue to flow consumable components 16 that are disposed outside the cartridge body 106 and then flows to the coolant return tube 34.

The plasma gas generally flows distally from the plasma gas tube 32, through the annular passageway 29 between the central insulator 24 and the intermediate insulator 26. The plasma gas is then directed through the axial passageways 57 of the cartridge body 106 toward the gas distributor 103 and enters the gas receiving chamber 150 between the gas distributor 103 and the electrode 100. The plasma gas then enters the plasma chamber 172 to form a plasma stream as the plasma gas is ionized by the pilot arc. The plasma stream then flows outside the tip 102 through the central orifice 174, and outside the secondary cap 112 through the central orifice 176.

The secondary gas generally flows distally from the secondary gas tube 35 (shown in FIGS. 1 and 2) and through the annular passageway 31 formed between the housing 33 and the outer insulator 28. The secondary gas continues to flow distally through axial passageways 57 of the cartridge body 106 and enters the secondary gas passageway 153 between the baffle member 110 and the shield cap 114. The secondary gas then flows through passageways (not shown) formed in the secondary cap 112 to stabilize the plasma stream.

Figure 9:
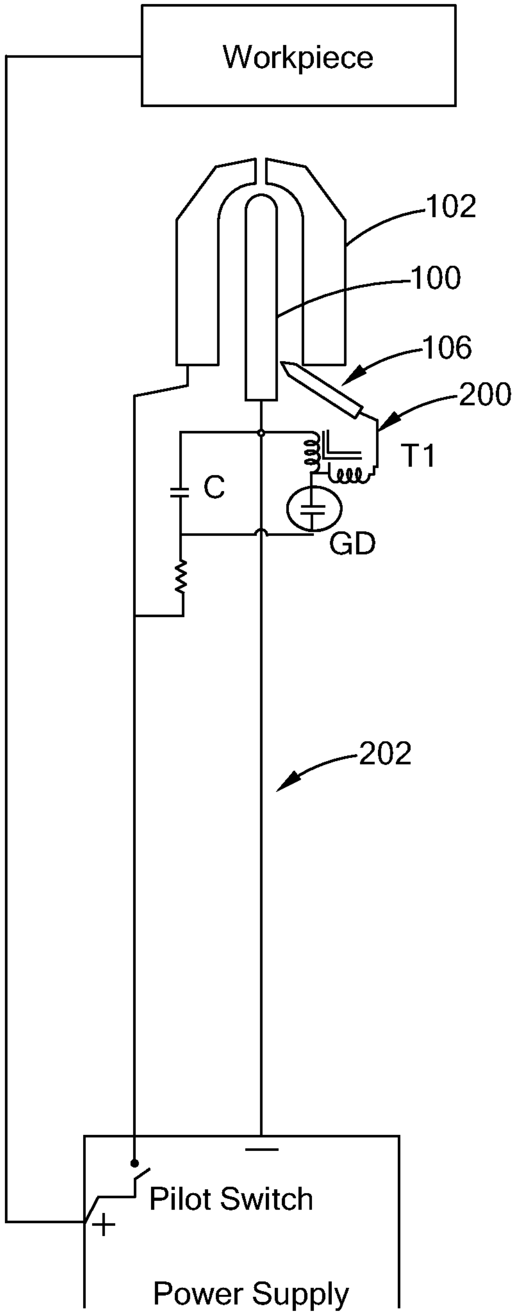
FIG. 9 is a graphic representation of a plasma arc torch and the power supply constructed in accordance with the principles of the present disclosure.
Figure 10:
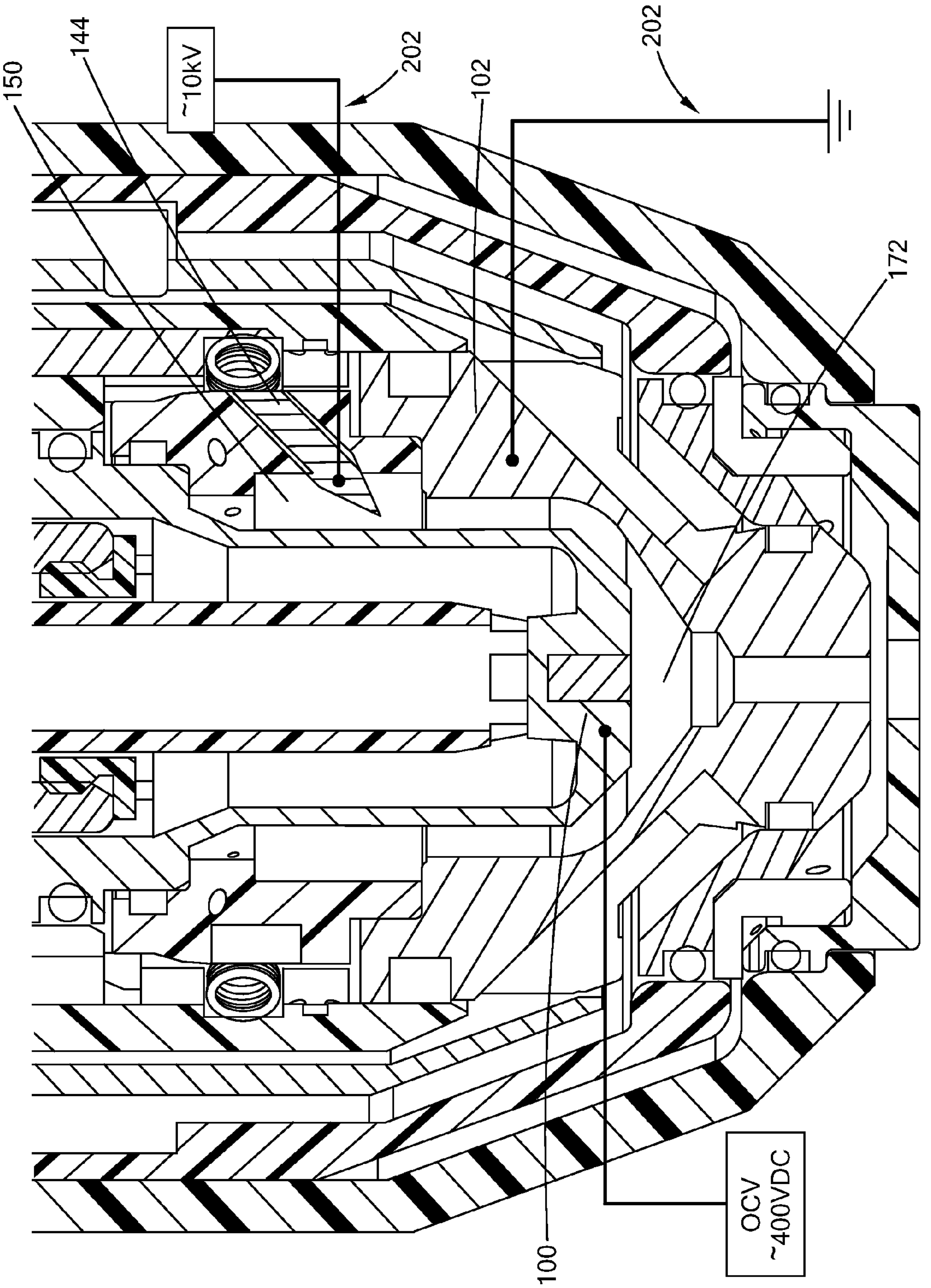
FIG. 10 is an enlarged view of a distal portion of a plasma arc torch constructed in accordance with the principles of the present disclosure, showing the electrical connection between a power supply and the plasma arc torch.

Referring to FIGS. 9 and 10, the secondary power circuit 200 may be disposed proximate the plasma arc torch 10 and in electrical communication with an open circuit of a power supply 14 and the third element 104. The cathodic or negative potential is carried by the cathode 22 and the electrode 100. The anodic or positive potential is carried by the anode 20, the distal anode member 108, the central anode member 109, and the tip 102. The third element 104 carries a potential for starting a pilot arc.

In one form, the secondary power circuit 200 includes a capacitor C and a transformer T1 and is configured to generate a high voltage pulse on the third element 42 to initiate a pilot arc to start the plasma arc torch 12. The capacitor C and a resistor are parallel with a transformer T1, which is in electrical communication with the third element 104. The transformer T1 has a low number of turns on its primary side, and a higher number of turns on the output side. It is understood that the secondary power circuit 200 may have a configuration different from that shown in FIG. 9 without departing from the scope of the present disclosure.

When electric power is applied to the plasma arc torch 10, a voltage is applied across the electrode 100 and the tip 102 by the main power circuit 202. Concurrently, a voltage is applied across the electrode 100 and the third element 104, particularly the conductive insert 144. When the voltage across the tip 102 and the electrode 100 rises, the capacitor C is charged. When the voltage is high enough, the voltage breaks over the gas discharge tube GD, which then puts a pulse of current through transformer T1. When the pulse occurs, a spark breaks over from the third element 104, particularly the conductive inset 144, to the electrode 100. The spark causes ionized air to flow into the gap between the electrode 100 and the tip 102, thereby initiating a pilot arc.

Figure 11A:
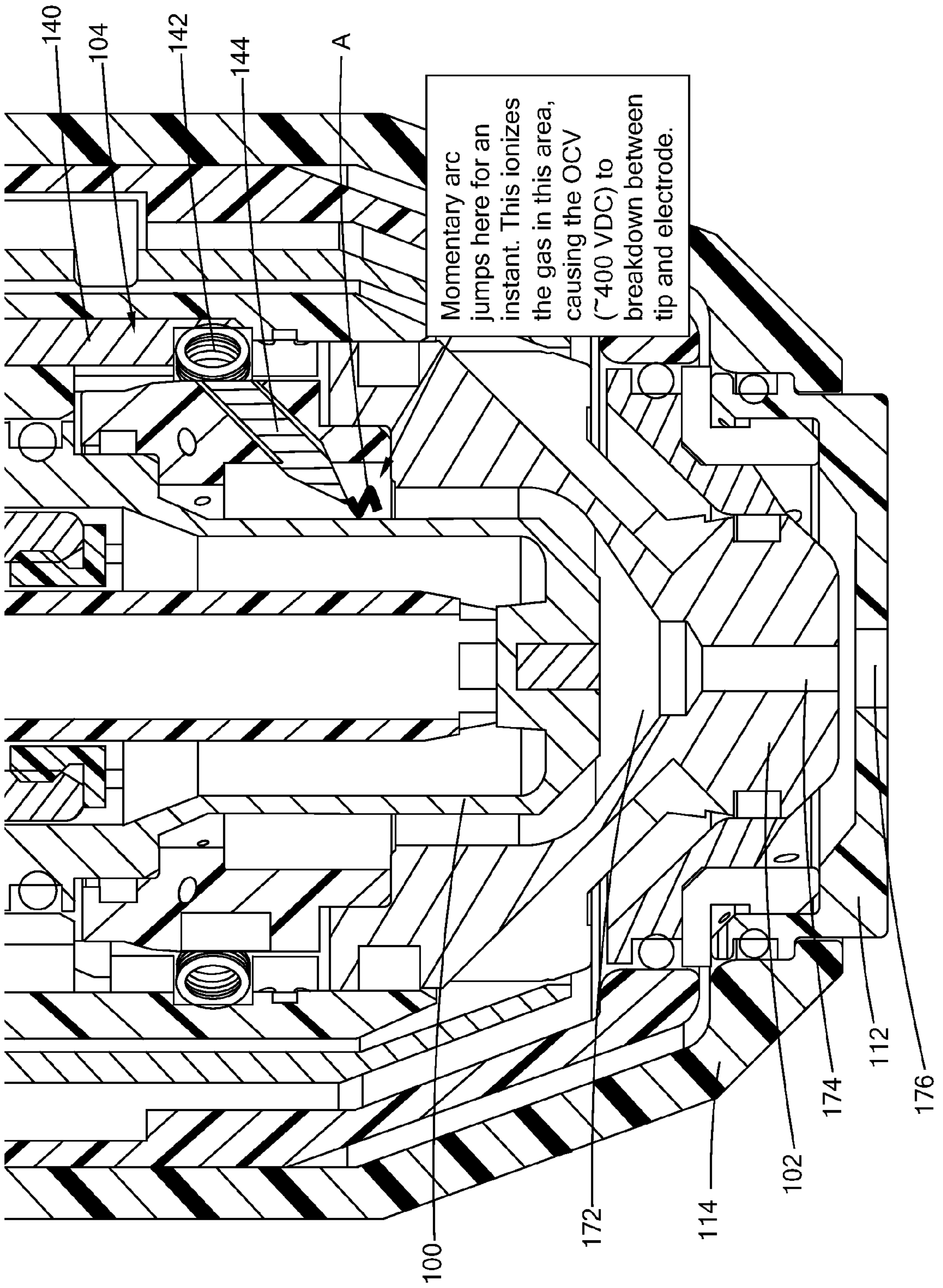
FIG. 11A through FIG. 11F are cross-sectional views of a torch head showing steps of initiating a pilot arc in accordance with the principles of the present disclosure.
Figure 11B:
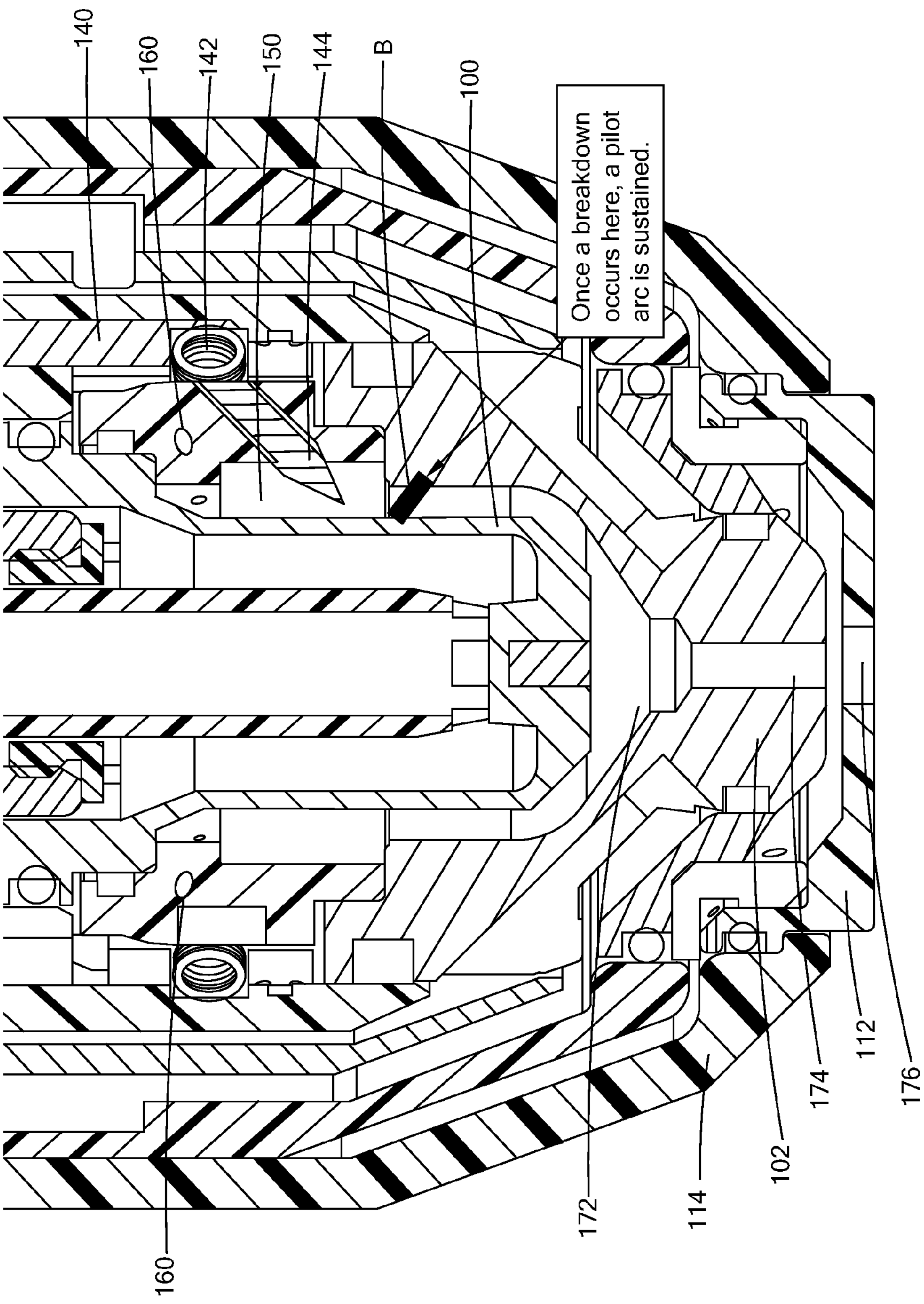
Figure 11C:
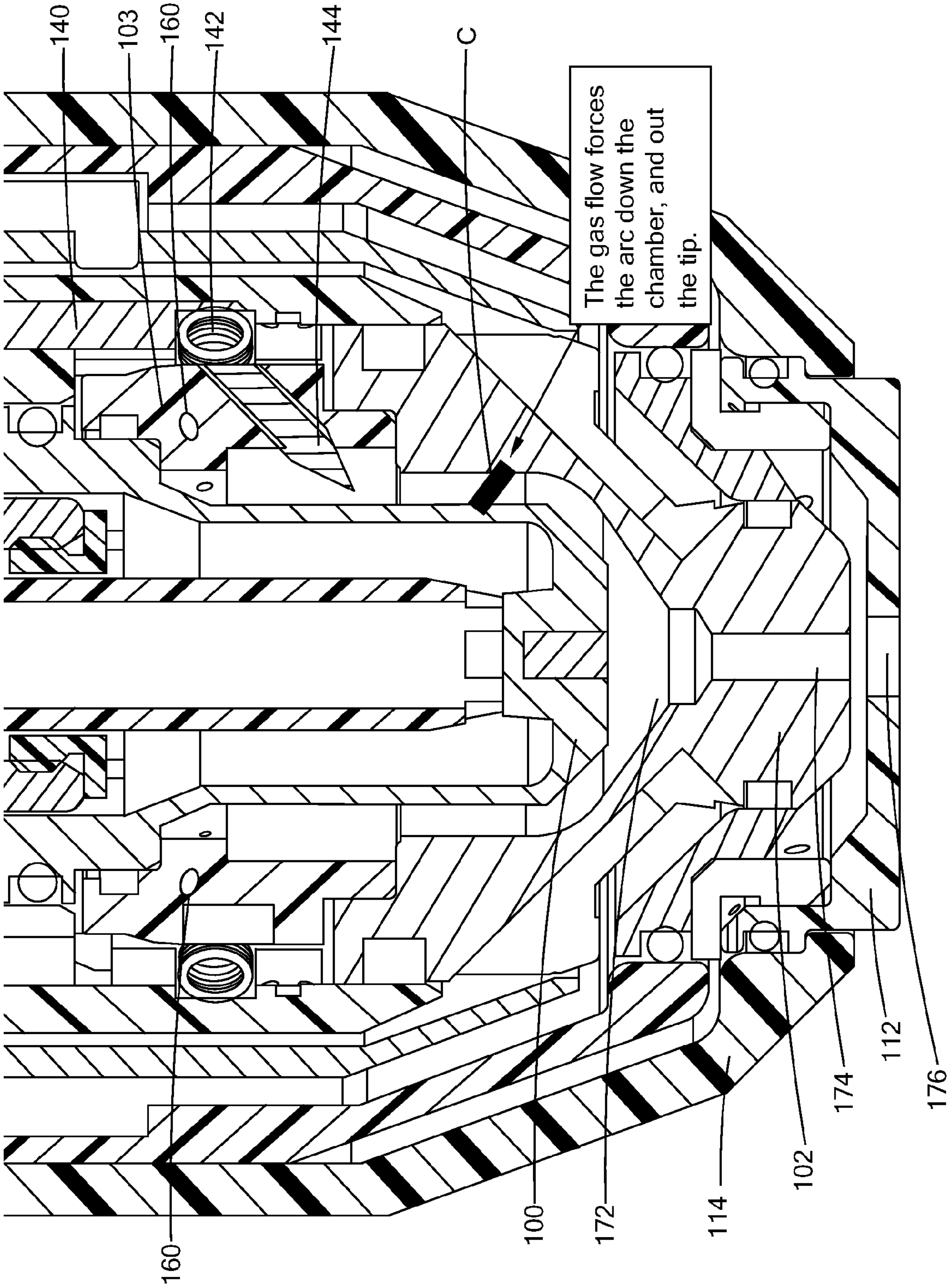
Figure 11D:
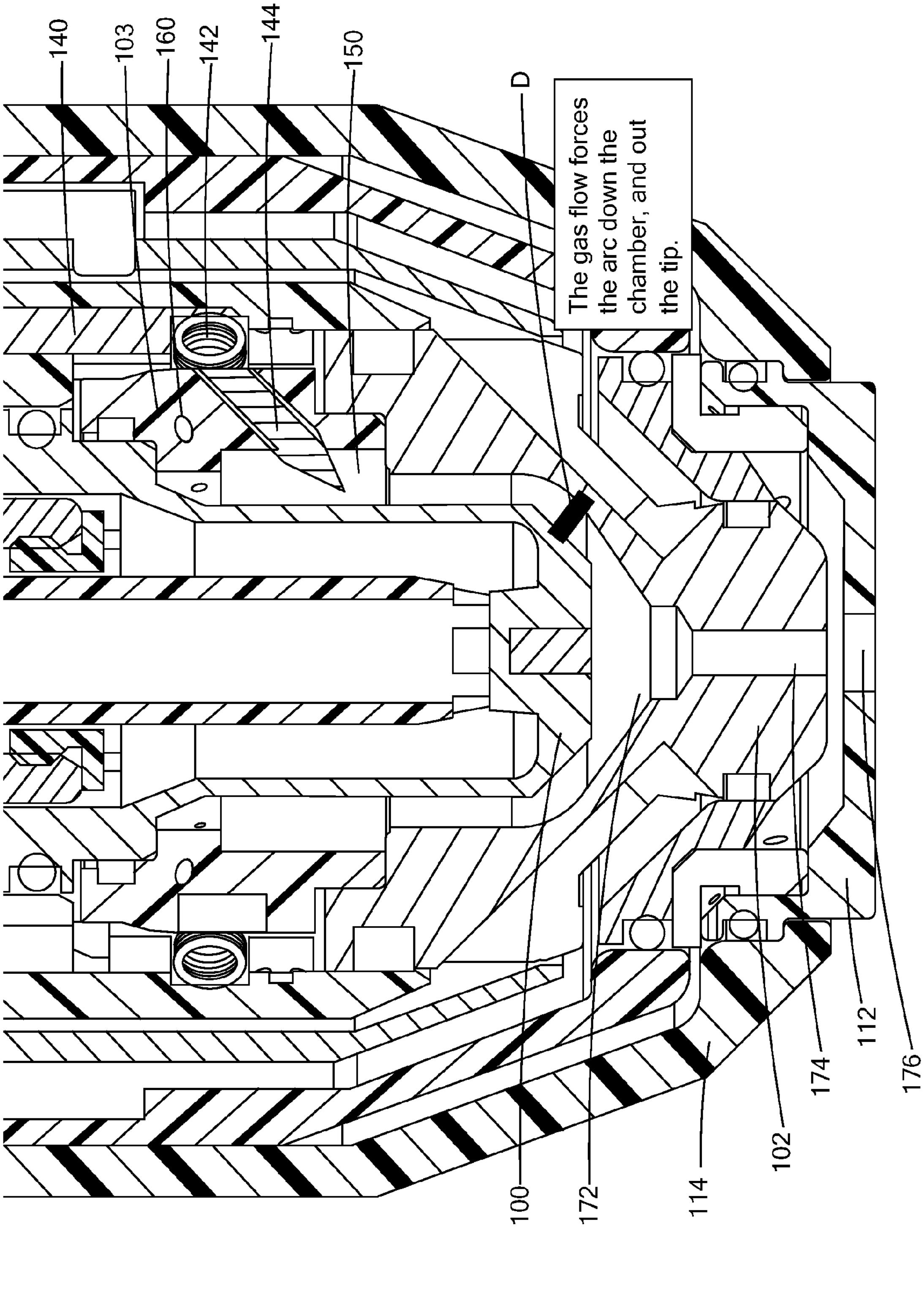
Figure 11E:
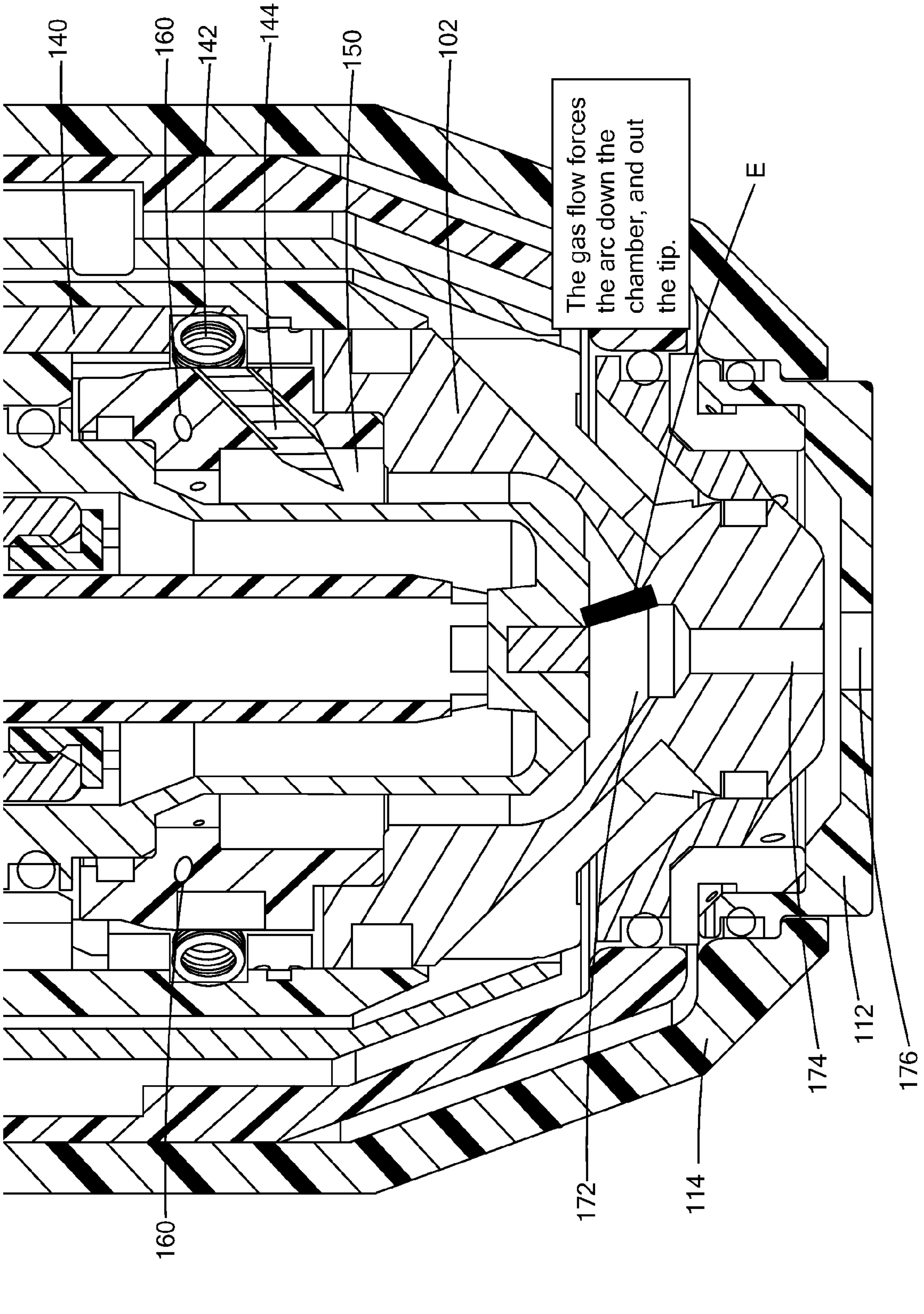
Figure 11F:
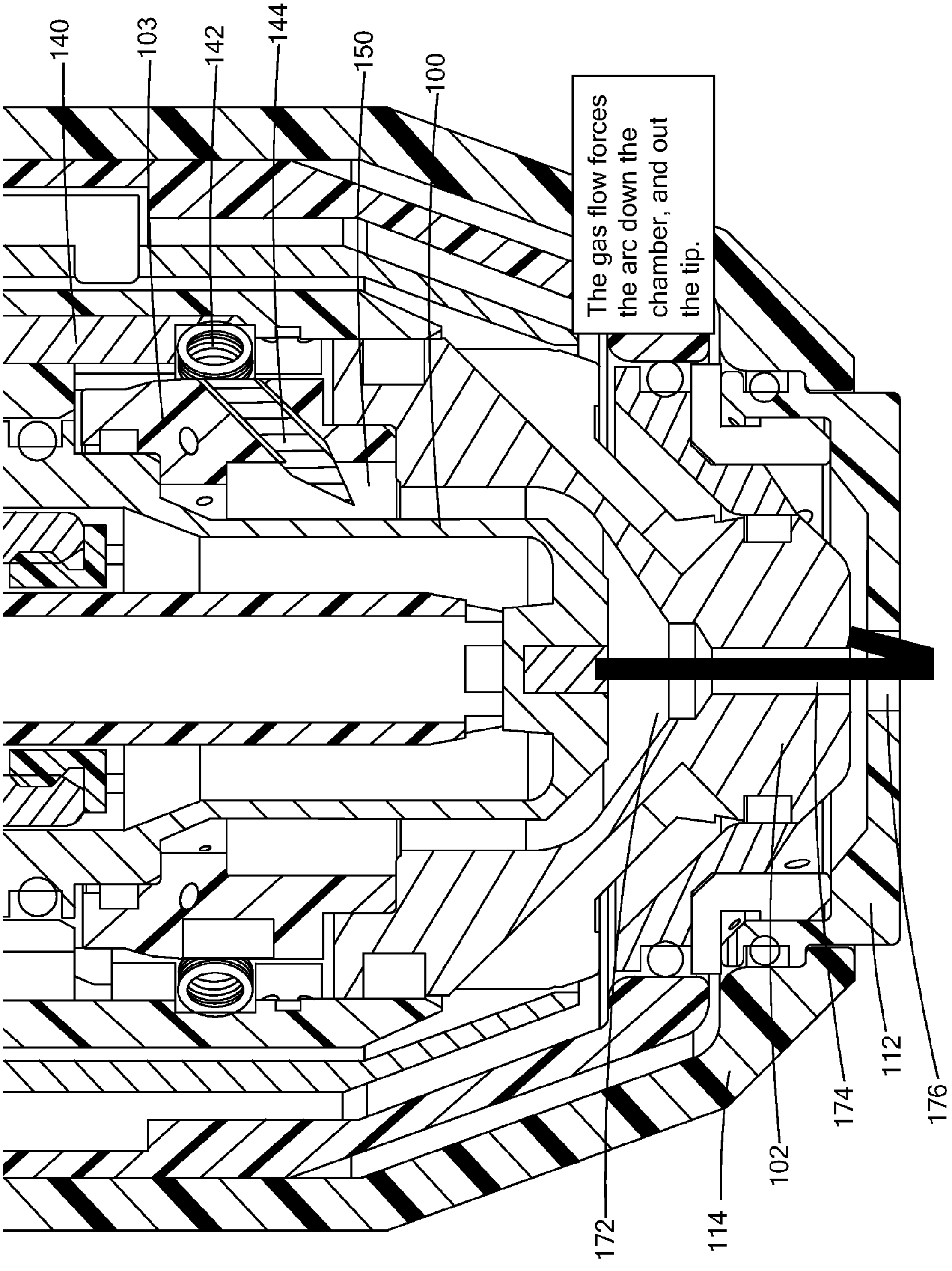

Referring to FIGS. 11A through 11F, when the gas supply is activated, a working gas flows through the central bores 70 and 84 of the cathode 32 and the electrode 38 and then is vented into the gas receiving chamber 150. Because a voltage is applied across the conductive insert 144 of the third element 104 and the electrode 100, a pilot arc is drawn between the conductive insert 144 and the electrode 100 as the gas flows therethrough. Momentary arc jumps at point A for an instant as shown in FIG. 11A. The momentary arc ionizes the gas in this area, causing the OCV (~400 VDC) to breakdown between the tip 102 and the electrode 100. Once a breakdown occurs, a pilot arc is sustained. The gas flow forces the arc down along the gas receiving chamber 150 between the gas distributor 103 and the electrode 100 into the plasma chamber 172 between the electrode 38 and the tip 40 as shown from point B, through points C and D to point E. As the arc reaches point E, the arc is pushed out of the tip 102 to a gap between the tip 102 and the workpiece as shown in FIG. 11F.

The plasma arc torch of the present disclosure allows for self-starting with little delay. Therefore, the rapid re-attach circuitry in the hand power supply and gas control logic as used in conventional plasma arc torch can be eliminated. Moreover, the torch restart after loss of cutting arc can be rapid and automatic, thus eliminating the need for an automatic switchover from cutting to pilot arc when cutting arc is lost. Because EMI generated during arc starting is less, shields on the torch lead can be eliminated.

Due to the lower voltage potential across the electrode 100 and the conductive insert 144, a pilot arc is generated in the gap formed between the electrode 100 and the conductive insert 144. As the plasma gas enters the plasma chamber 172, the plasma gas is ionized by the pilot arc, which causes a plasma stream to form within the plasma chamber 172 and flow distally through the central exit orifice 174 of the tip 102. Additionally, the secondary gas flows into the secondary gas plenum 167 and stabilizes the plasma stream upon exiting the central exit orifice 174 of the tip 102. As a result, a highly uniform and stable plasma stream exits the central exit orifice 168 of the secondary cap 112 for high current, high tolerance cutting operations.

The current circulation path for the HV current is relatively small, and can be very low power. The secondary power circuit 200 can be made to fire automatically whenever the open circuit voltage is present, or can be triggered by a signal to fire. The secondary power circuit 200 is low power (around 0.05 joules) and is contained within or near the plasma arc torch 12. Therefore, the electromagnetic interference (EMI) is significantly reduced. The high voltage impulse on the conductive insert 144 of the third element 104 ionizes part of the gas flowing through the secondary gas chamber, thereby lowering the breakdown voltage of the air between the tip 40 and electrode 38. The secondary power circuit 200 may be automatically energized when an open circuit voltage is detected in the power supply, or may be remotely controlled, for example, by a signal from a controller (not shown).

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A plasma arc torch comprising:

a main power circuit for applying a voltage across an electrode disposed within the plasma arc torch, the electrode adapted for electrical connection to a cathodic side of a power supply;

a tip positioned distally from the electrode and adapted for electrical connection to an anodic side of the power supply during piloting, a plasma chamber being formed between the electrode and the tip;

a third element disposed near a proximal end of the plasma chamber, wherein the third element comprises:

a plurality electrically of conductive extensions extending between a first electrically conductive ring and a second electrically conductive ring, the first electrically conductive ring disposed towards a distal end of the third element; and a secondary power circuit disposed proximate the plasma arc torch and in electrical communication with the third element, the secondary power circuit configured to generate a high voltage pulse on the third element using input to the secondary power circuit to initiate a first arc to start the plasma arc torch.

2. The plasma arc torch according to claim 1 further comprising a gas distributor disposed between the electrode and the tip and forming a plasma chamber therebetween, wherein the third element comprises a conductive element disposed within the plasma arc torch and a conductive insert extending through the gas distributor and into the plasma chamber.

3. The plasma arc torch according to claim 1, wherein the first conductive ring and the second conductive ring are spring elements.

4. The plasma arc torch according to claim 1, wherein the secondary power circuit is disposed within the plasma arc torch.

5. The plasma arc torch according to claim 1, wherein the secondary power circuit is disposed within a torch head of the plasma arc torch.

6. The plasma arc torch according to claim 1, wherein the plasma arc torch is high frequency start.

7. The plasma arc torch according to claim 1, wherein the secondary power circuit has a relatively low power of about 0.05 joules.

8. The plasma arc torch according to claim 1, wherein the secondary power circuit is automatically energized when an open circuit voltage is detected in the power supply.

9. The plasma arc torch according to claim 1, wherein the secondary power circuit is energized by a signal from a controller.

10. The plasma arc torch according to claim 1, wherein the secondary power circuit comprises a capacitor and resistor in parallel with a transformer, wherein transformer is in electrical communication with the third element.

11. A system for initiating a first arc in a plasma arc torch, the plasma arc torch having an electrode and a tip electrically connected to a power supply and configured to ionize a gas to generate a plasma stream, the system comprising:

a third element comprising:

a plurality of electrically conductive extensions extending between a first electrically conductive ring and a second electrically conductive ring, the first electrically conductive ring disposed towards a distal end of the third element; and a secondary power circuit, separate from a main power circuit, disposed proximate the plasma arc torch and in electrical communication with the third element, the secondary power circuit configured to generate a high voltage pulse on the third element using open circuit voltage of the power supply to initiate a first arc to start the plasma arc torch.

12. The system according to claim 11, wherein the third element comprises a conductive element disposed within the plasma arc torch and a conductive insert extending through the gas distributor and into the plasma chamber.

13. The system according to claim 11, wherein the secondary power circuit is disposed within the plasma arc torch.

14. The system according to claim 11, wherein the secondary power circuit is disposed within a torch head of the plasma arc torch.

15. The system according to claim 11, wherein the third element is disposed near a proximal end of a plasma chamber formed between the electrode and the tip.

16. The system according to claim 11, wherein the secondary power circuit is remotely controlled.

17. The system according to claim 11, wherein the secondary power circuit is automatically energized when an open circuit voltage is detected in the power supply.

18. The system according to claim 11, wherein the secondary power circuit is energized by a signal from a controller.

19. A method of initiating a first arc in a plasma arc torch comprising: generating a high voltage pulse on a third element using a secondary power circuit in electrical communication with the third element, the secondary power circuit being separate from a main power circuit and a power supply that sends electrical current to an electrode and tip of the plasma arc torch, the third element comprising a plurality of electrically conductive extensions extending between a first electrically conductive ring and a second electrically conductive ring, the first electrically conductive ring disposed towards a distal end of the third element.

20. The method according to claim 19, wherein the secondary power circuit is automatically energized when an open circuit voltage is detected in the power supply.

21. The method according to claim 19, wherein the secondary power circuit is energized by a signal from a controller.

* * * * *